(12) United States Patent
Cornell et al.

(10) Patent No.: US 11,466,766 B2
(45) Date of Patent: Oct. 11, 2022

(54) GEAR DEVICE AND METHOD FOR OPERATION OF A GEAR DEVICE

(71) Applicant: Ford Global Technologies, LLC, Dearborn, MI (US)

(72) Inventors: John Cornell, Allenton, MI (US); Fabian Gadau, Ann Arbor, MI (US); Mark Michael Madin, Canton, MI (US); Richard Karl Werth, Milan, MI (US); Joy Hines Forsmark, Saint Clair Shores, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 222 days.

(21) Appl. No.: 16/596,455

(22) Filed: Oct. 8, 2019

(65) Prior Publication Data

US 2021/0102612 A1    Apr. 8, 2021

(51) Int. Cl.
| | |
|---|---|
| *F16H 55/14* | (2006.01) |
| *F16H 55/17* | (2006.01) |
| *F16H 55/06* | (2006.01) |
| *F16H 57/00* | (2012.01) |
| *B60L 50/60* | (2019.01) |

(52) U.S. Cl.
CPC ............ *F16H 55/14* (2013.01); *F16H 55/06* (2013.01); *F16H 55/17* (2013.01); *F16H 57/0006* (2013.01); *B60L 50/60* (2019.02)

(58) Field of Classification Search
CPC ........... F16H 55/14; F16H 55/06; F16H 55/17
See application file for complete search history.

(56) References Cited

U.S. PATENT DOCUMENTS

| | | | | |
|---|---|---|---|---|
| 2,380,776 | A * | 7/1945 | Miller | F16H 55/14 74/443 |
| 3,843,188 | A * | 10/1974 | Kirschner | F16H 55/14 295/7 |
| 4,174,643 | A * | 11/1979 | Tsukamoto | F16H 55/14 74/433.5 |
| 4,197,759 | A * | 4/1980 | Krebs | F16H 55/14 403/226 |
| 5,657,666 | A * | 8/1997 | Tsuda | B29C 45/0025 248/604 |
| 5,810,668 | A * | 9/1998 | Graham | F16H 3/14 464/101 |
| 5,980,407 | A * | 11/1999 | Takamori | F16D 65/12 188/264 A |

(Continued)

FOREIGN PATENT DOCUMENTS

| | | |
|---|---|---|
| DE | 19757433 A1 | 6/1999 |
| DE | 102012207419 A1 | 11/2013 |

*Primary Examiner* — William Kelleher
*Assistant Examiner* — Gregory T Prather
(74) *Attorney, Agent, or Firm* — David Kelley; McCoy Russell LLP

(57) ABSTRACT

Gear devices and methods for operating gear devices are provided. In one example, a gear device is provided that comprises structures designed to attenuate targeted vibrations occurring during rotation of the gear device. The structures includes radially aligned struts extending between an inner carrier and an outer carrier, a plurality of openings arranged between the struts, and/or resonators extending between sequential struts.

18 Claims, 7 Drawing Sheets

(56) References Cited

U.S. PATENT DOCUMENTS

| | | | | |
|---|---|---|---|---|
| 6,181,899 B1* | 1/2001 | Fukuchi | ............... | F16H 55/17 |
| | | | | 399/117 |
| 6,330,836 B1* | 12/2001 | Watanabe | ............... | C22C 38/04 |
| | | | | 148/586 |
| 9,303,751 B2 | 4/2016 | Steinberger et al. | | |
| 2002/0017153 A1* | 2/2002 | Sakamaki | ............... | F16H 55/17 |
| | | | | 74/434 |
| 2002/0029648 A1* | 3/2002 | Noguchi | ............... | F16H 55/17 |
| | | | | 74/461 |
| 2002/0029649 A1* | 3/2002 | Bauseler | ............... | F16H 55/17 |
| | | | | 74/462 |
| 2002/0169045 A1* | 11/2002 | Kodama | ............... | F16F 15/121 |
| | | | | 474/161 |
| 2008/0234080 A1* | 9/2008 | Fan | ............... | F16H 55/171 |
| | | | | 474/94 |
| 2009/0038877 A1* | 2/2009 | Willmann | ............... | F16H 55/14 |
| | | | | 180/444 |
| 2012/0216645 A1* | 8/2012 | Tanaka | ............... | B62D 5/0409 |
| | | | | 74/434 |
| 2016/0363206 A1* | 12/2016 | Modrzejewski | ............... | F16H 55/06 |
| 2019/0011014 A1* | 1/2019 | Zouani | ............... | F16F 15/262 |
| 2021/0180674 A1* | 6/2021 | Topfer | ............... | F16H 19/08 |

* cited by examiner

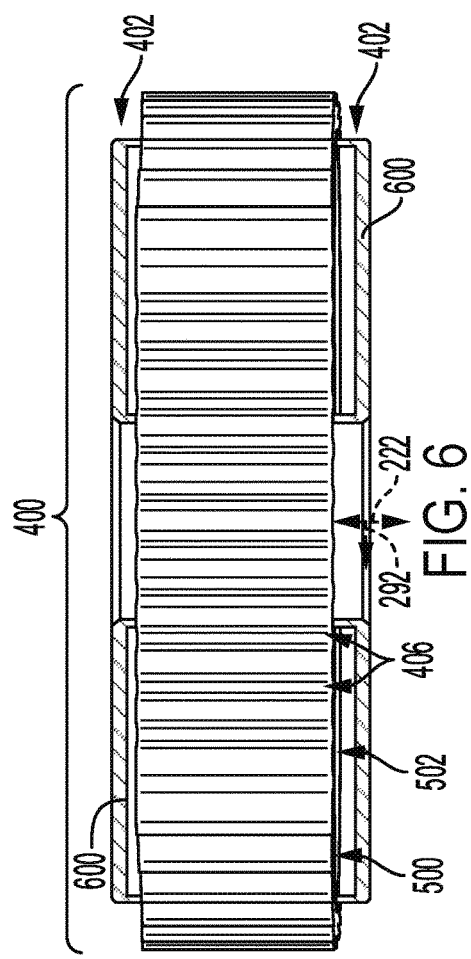
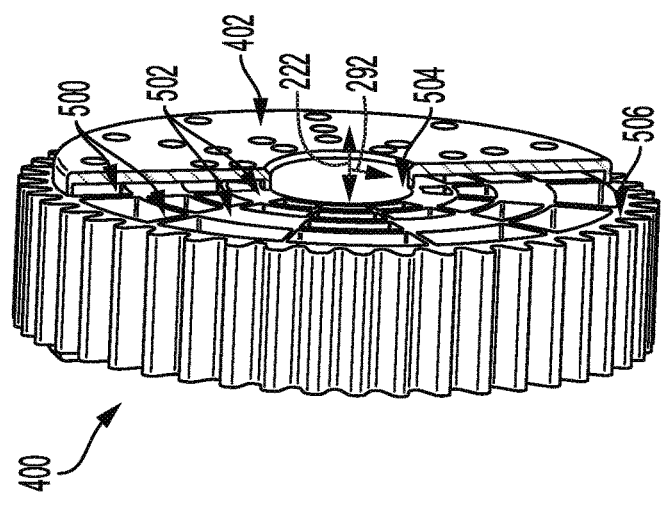
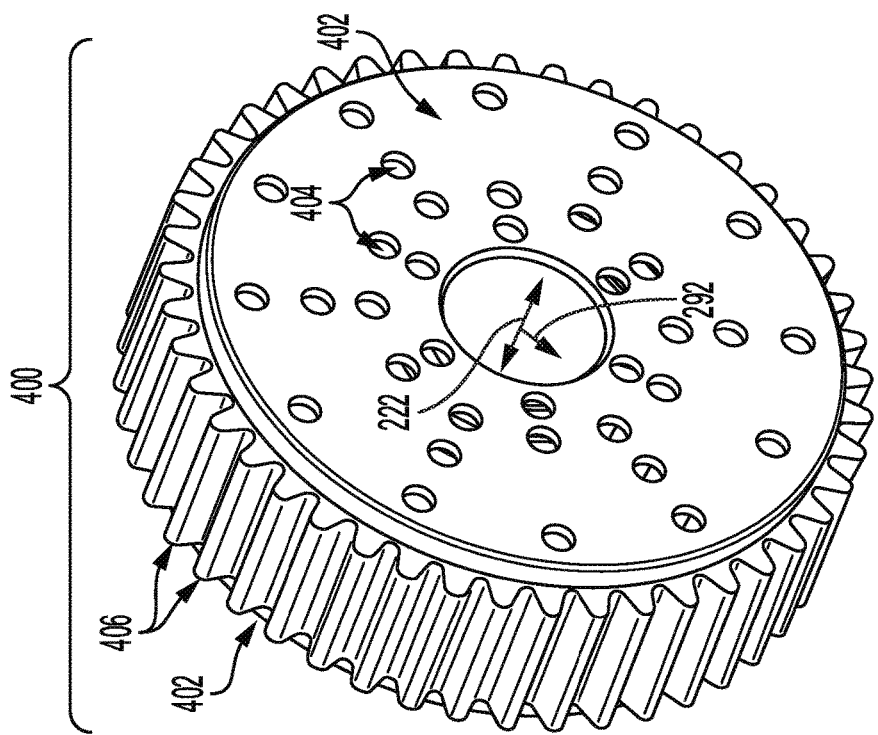

GEAR DEVICE AND METHOD FOR OPERATION OF A GEAR DEVICE

FIELD

The present description relates generally to a gear device designed to dampen vibrations and a method for operation of said gear device.

BACKGROUND/SUMMARY

Gears are used in a variety of applications, such as vehicle drivetrains, to allow rotational energy transfer between selected components (e.g., motors and drive wheels, in the vehicular embodiment).

Gear systems have incorporated hydraulic dampers into the gear to dampen undesirable vibrations. One example approach is shown by Steinberger in U.S. Pat. No. 9,303,751 B2. Steinberger discloses a power take-off gear with a radially aligned piston designed to dampen undesirable vibrations during operation of the power take-off gear. Other systems have made attempts to reduce gear lash via springs and other mechanical dampening devices.

The inventors, however, have recognized several drawbacks with previous gear systems attempting to dampen unwanted system vibrations. For instance, Steinberger's gearing system includes complex systems, such as fluid chambers, pistons, etc., to achieve noise reduction in the gear system. Steinberger's mechanical system may, due to the system's complexity, be susceptible to degradation. As a result, the longevity and reliability of the system is reduced. Other mechanical dampening systems incorporating springs, for example, may also be susceptible to degradation and therefore not achieve desired levels of system durability.

To address at least some of the abovementioned problems, a gear device is provided which comprises an outer carrier with a plurality of radially aligned struts and a plurality of openings spaced between the plurality of struts and designed to attenuate vibrations occurring during rotation of the gear device. The gear device further includes an inner carrier coupled to the outer carrier via the plurality of radially aligned struts extending there between. In this way, the gear device decreases noise, vibration, and harshness (NVH) in the system in which the device is deployed. As a result, gear wear is reduced and customer satisfaction is increased.

In one example, the gear device may further comprise a plurality of resonators sequentially spaced angularly around the gear device and coupled to the plurality of radially aligned struts. The resonators enable targeted frequency bands occurring in the system in which the device is deployed to be dampened.

In another example, the plurality of resonators may include a first row positioned radially inward towards a rotational axis of the gear device from a second row in the plurality of resonators. Arranging the resonators in this way allows for even more granular tuning of frequency band dampening to facilitate precise attenuation of unwanted vibrations in the system.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 4-6 show a second example of a gear device with openings in end plates of the device.

FIGS. 2-14 are drawn to scale. However, other relative dimensions of the components may be used, in other embodiments.

DETAILED DESCRIPTION

Figure 1:
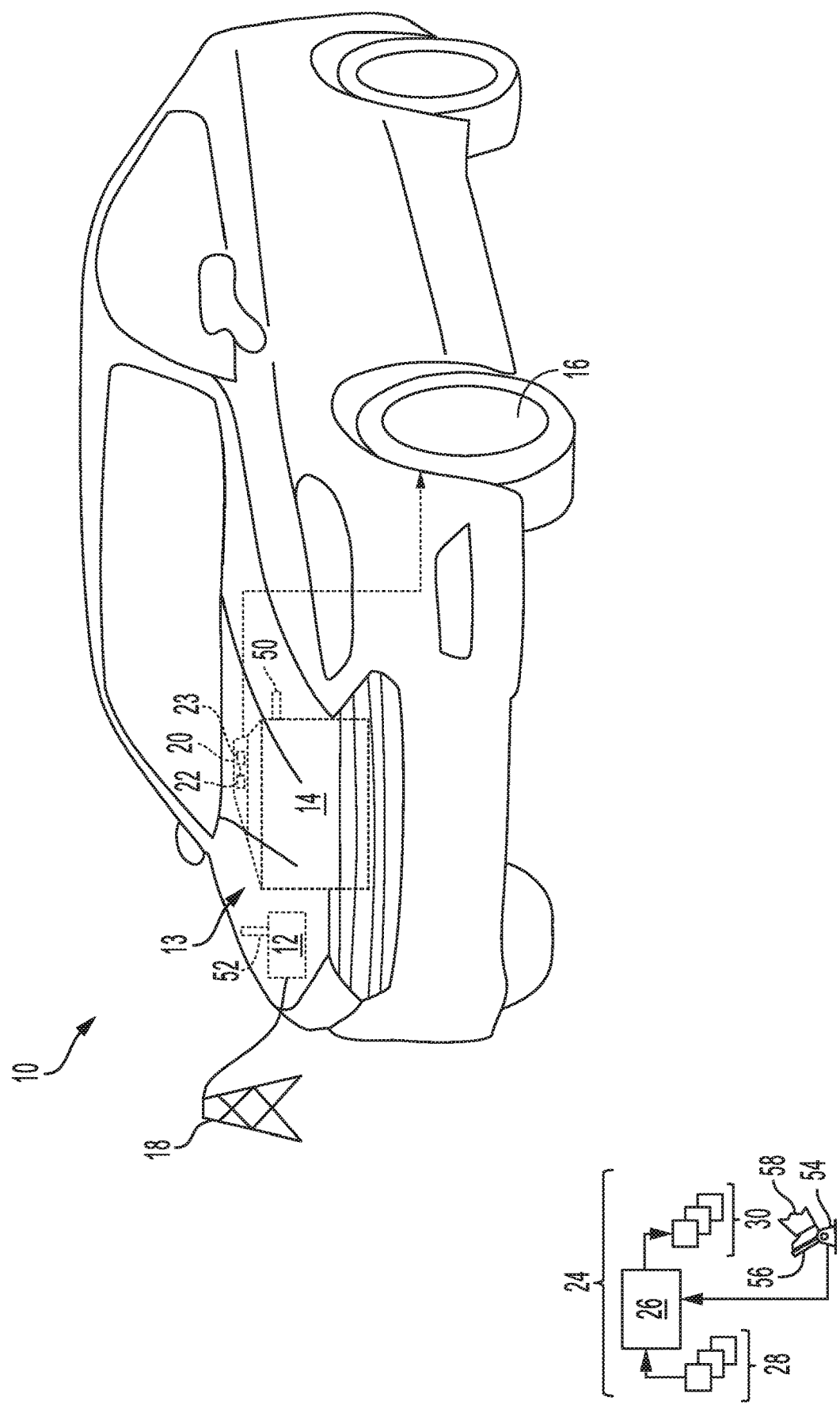
FIG. 1 shows a schematic depiction of a vehicle with a gear system including a gear device.
Figure 3:
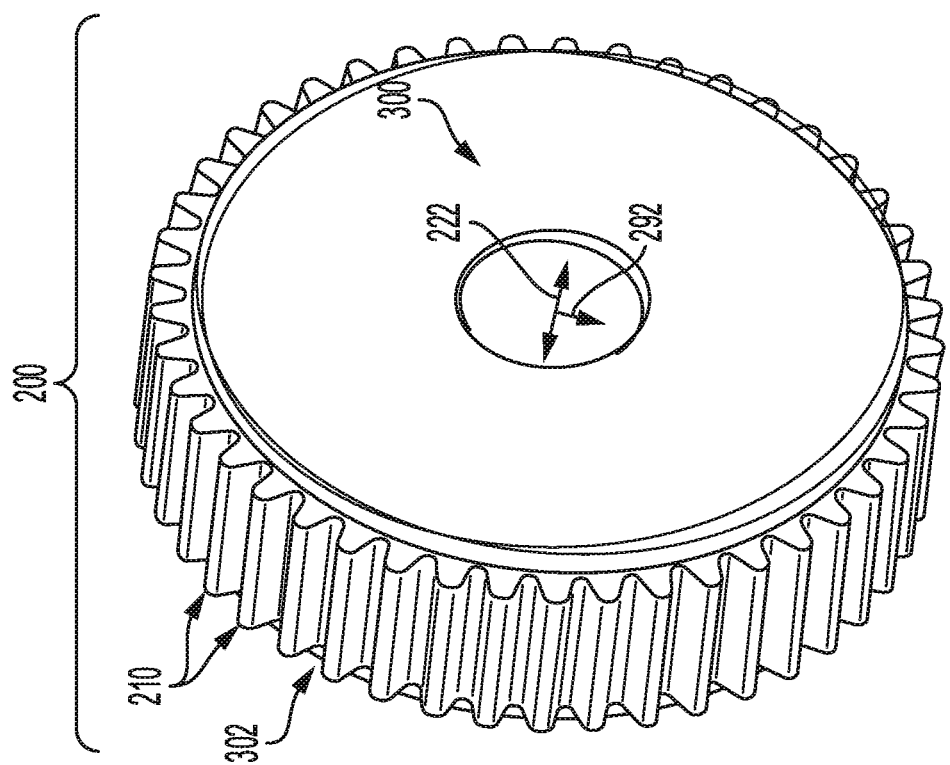
FIGS. 2-3 show a first example of a gear device for use in a gear system to attenuate unwanted frequencies via struts and resonators.
Figure 2:
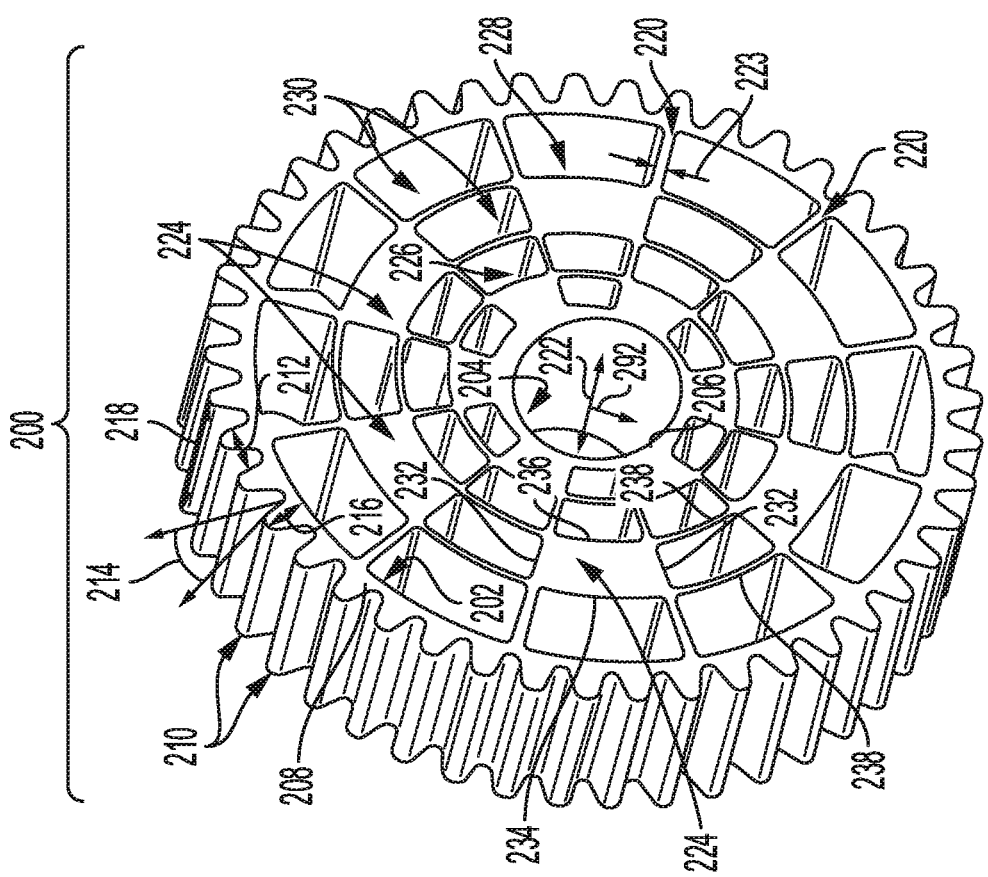
Figure 8:
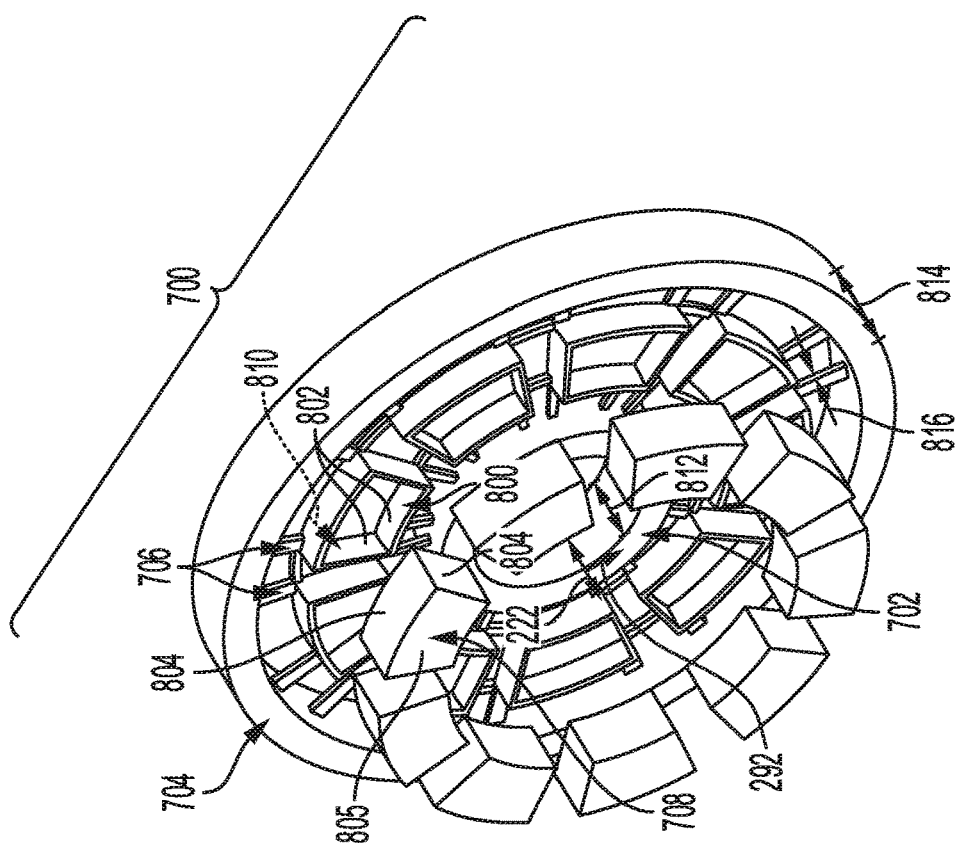
FIGS. 7-8 show a third example of a gear device with resonators mated in trays in the device.
Figure 7:
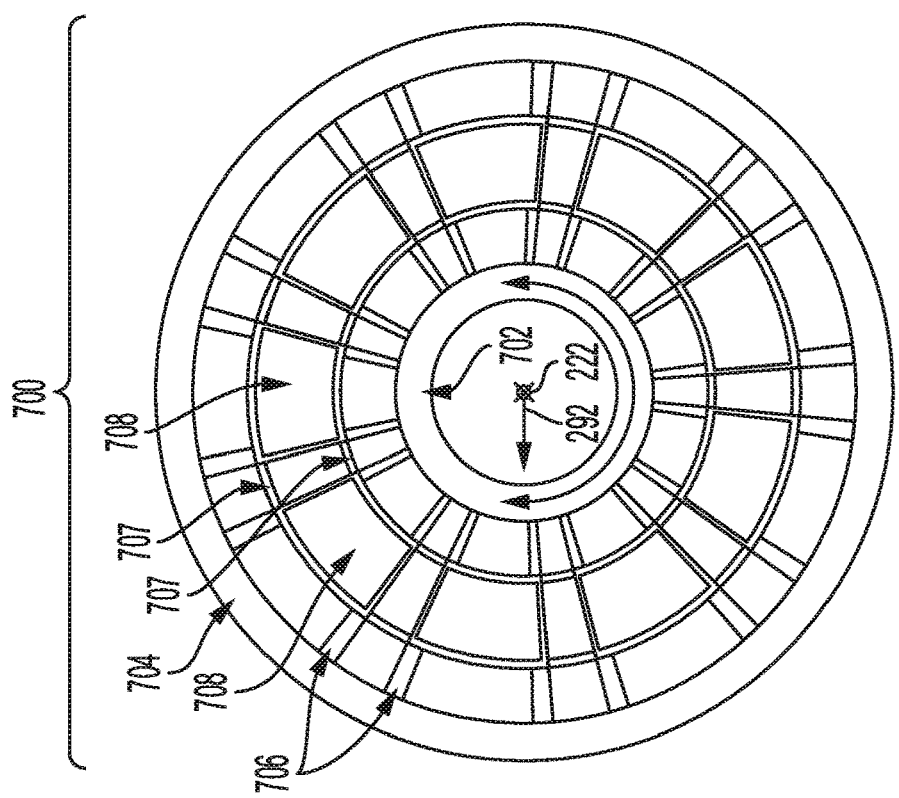
Figure 10:
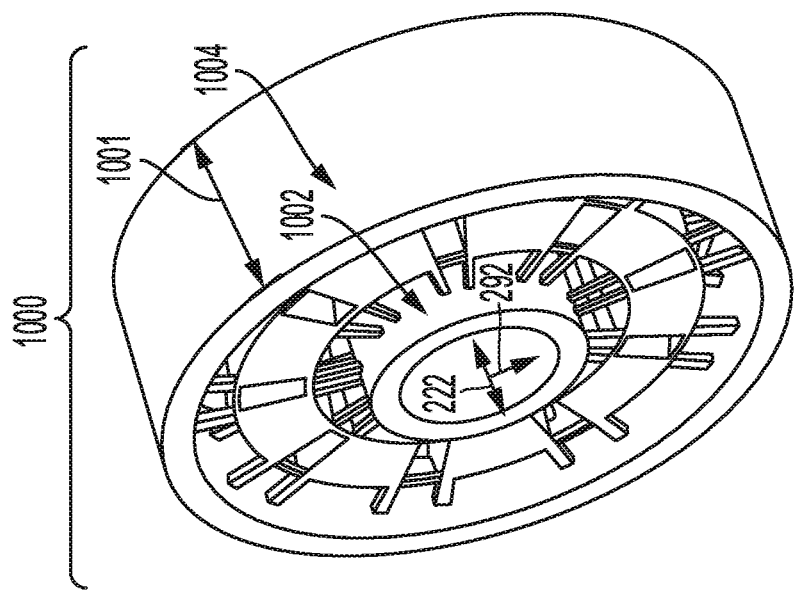
FIG. 10 shows a fifth example of a gear device with an increased axial length.
Figure 9:
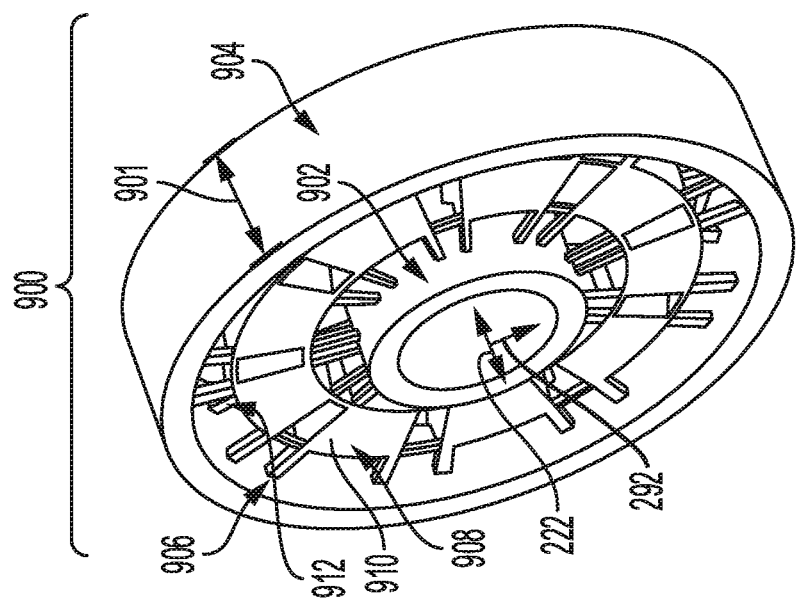
FIG. 9 shows a fourth example of a gear device with an increased axial length.
Figure 12:
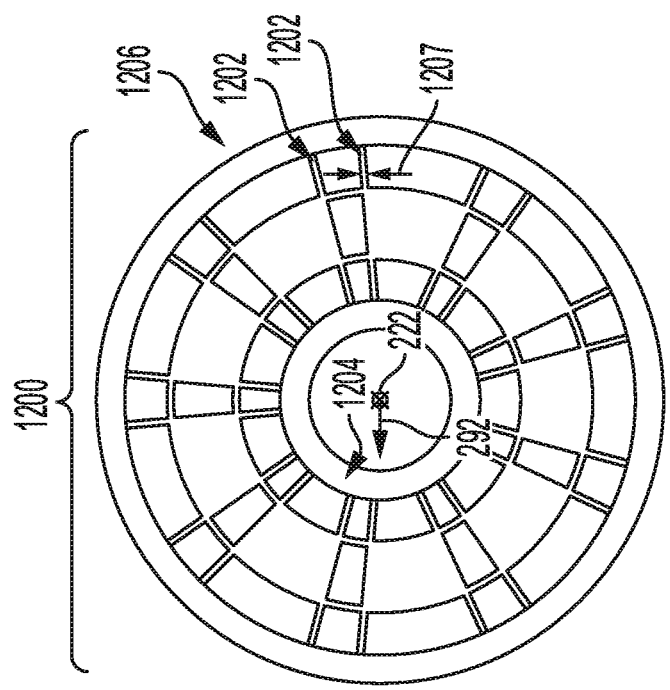
FIG. 12 shows a seventh example of a gear device with non-tapered struts.
Figure 11:
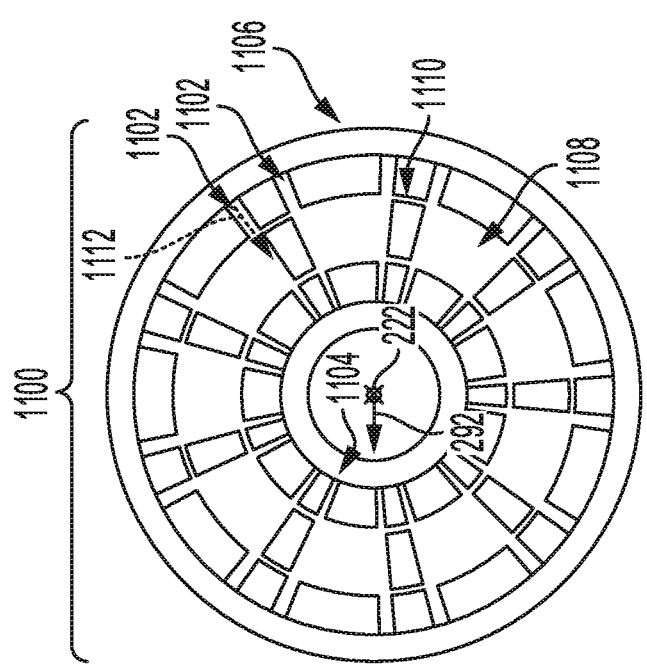
FIG. 11 shows a sixth example of a gear device with tapered struts.
Figure 14:
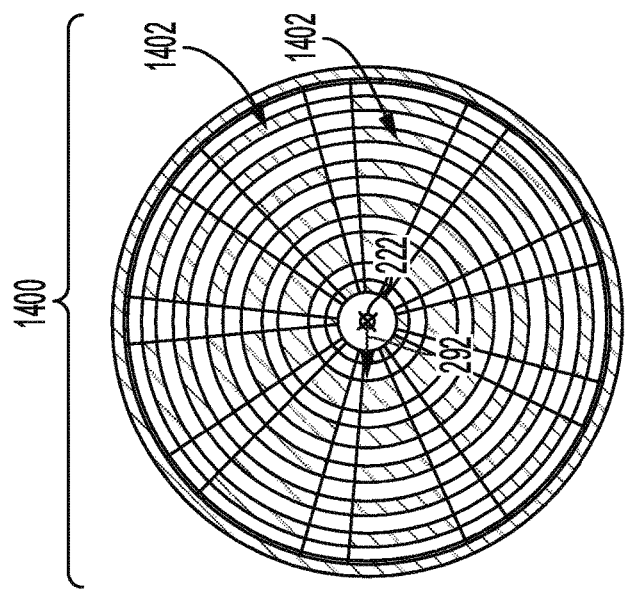
FIG. 14 shows a ninth example of a gear device with an increased number of resonator rows.
Figure 13:
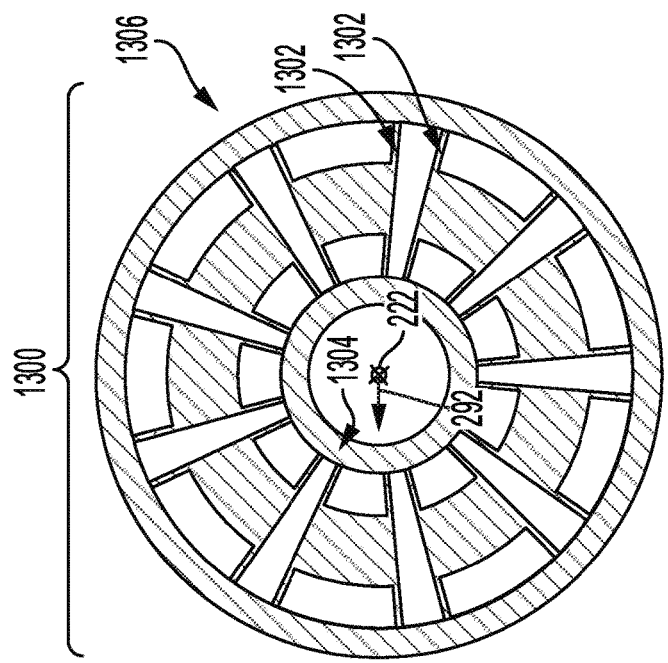
FIG. 13 shows an eighth example of a gear device without beams extending between struts.
Figure 15:
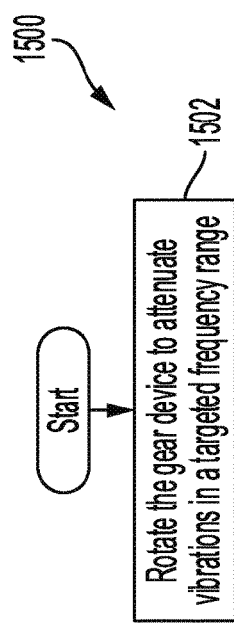
FIG. 15 shows a method for operation of a gear device.

A gear device designed to attenuate unwanted noise, vibration, and harshness (NVH) in the system in which it is deployed is described herein. FIG. 1 shows a schematic depiction of a system in which a gear device for dampening unwanted frequencies in the system is used. Although, the gear device is shown included in a battery electric vehicle (BEV), it will be understood that the gear device described herein may be deployed in a wide variety of operating environments such as vehicles harnessing power from internal combustion engines, hybrid vehicles, industrial machines, aerospace applications, maritime applications, etc. FIG. 2 shows a first example of a gear device designed to attenuate targeted frequencies. FIG. 3 shows the gear device illustrated in FIG. 2 with end plates. FIG. 4 shows a second example of a gear device with end plates having openings. FIGS. 5 and 6 illustrate different views of the second example of a gear device with a portion of the end plates omitted to reveal underlying components. FIGS. 7 and 8 show a third example of a gear device with resonators mated in trays in the device. FIG. 9 illustrates a fourth example of a gear device with an increased axial width. FIG. 10 illustrates a fifth example of a gear device. FIG. 11 shows a sixth example of a gear device with struts having tapered profiles. FIG. 12 depicts a seventh example of a gear device with struts which do not radially taper. FIG. 13 shows an eighth example of a gear device without beams extending between the struts. FIG. 14 shows a ninth example of a gear device with an increased number of resonators rows. FIG. 15 shows a method for operation of a gear device.

Referring to FIG. 1, a vehicle 10 including a powerplant 13 including an electric motor 14 and an energy storage device 12 are shown. The electric motor 14 is designed to generate motive power using energy from the energy storage device 12 and may include rotors, stators, etc., for power generation. A drive wheel 16 in the vehicle 10 may receive rotational energy generated via the electric motor 14 to propel the vehicle along a drive surface (not shown). The drive wheel is illustrated as a front wheel, however two-wheel drive, rear wheel drive, four wheel drive, etc., powertrain configurations have been envisioned.

In one example, the vehicle may include only the electric motor 14 for propulsion and therefore may be referred to as a battery electric vehicle (BEV). The electric motor 14 may be supplied with electrical power via the energy storage device 12. Energy storage device may be recharged from an external energy source such as a stationary electrical power grid 18 (e.g., home or remote charging station), a portable energy source, solar charging station, etc., via an electrical plug, capacitive charging, etc. In one example, energy storage device 12 may be a battery, capacitor, flywheel, and/or other suitable energy storage device.

In other examples, the vehicle 10 may harness motive energy from both an engine and the electric motor 14 and therefore may be referred to as a hybrid electric vehicle. Thus, in such an example the powerplant 13 may include the motor 14 and an internal combustion engine. Hybrid propulsion embodiments may include full hybrid systems, in which the vehicle can run on just the engine, just the electric motor, or a combination of both. Assist or mild hybrid configurations may also be employed, in which the engine is the primary torque source, with the hybrid propulsion system acting to selectively deliver added torque, for example during tip-in or other conditions.

The vehicle 10 is shown including a gear system 20 designed to transfer rotational energy from the electric motor 14 to the drive wheel 16 and/or other drive wheels in the vehicle. The gear system 20 is a drivetrain including a transmission, in the depicted example. The drivetrain 20 may include a variety of mechanical components such as gears, flywheels, clutches, etc. Specifically, the drivetrain 20 includes a gear device 22. Specifically countered structures such as struts, resonators, etc., in the gear device are used to attenuate the targeted frequencies and are described in greater detail herein. The gear device 22 is configured to attenuate targeted frequencies in the drivetrain. The gear device includes a plurality of structures such as struts, resonators, etc., facilitating the vibration dampening, discussed in greater detail herein. Although, the gear device 22 is shown included in a vehicle drivetrain, the gear device has wide reaching applicability to a variety of suitable operating environments including industrial applications, aerospace applications, maritime applications, and/or other environments utilizing gears. It will also be understood that the gear device 22 may be coupled to a second device 23 (e.g., a second gear, a toothed belt, chain, etc.). To elaborate, teeth in each of the devices may be mated with one another.

The electric motor 14 may be controlled at least partially by a control system 24 including controller 26. Controller 26 may receive various signals from sensors 28 coupled to the electric motor 14 and send control signals to various actuators 30 coupled to the motor and/or vehicle to enable output of the motor to be adjusted as desired.

The electric motor 14, drivetrain 20, and energy storage device 12 are schematically represented in FIG. 1. However, it will be appreciated that the components have greater structural complexity than is illustrated in FIG. 1. The gear device 22, in particular, includes resonators, struts, and other structures that allow the device to attenuate frequencies. Various examples of the gear device are depicted in FIGS. 2-14 and described in greater detail herein.

The controller 26 may be configured to trigger one or more actuators and/or send commands to components. For instance, the controller 26 may trigger adjustment of the motor 14, energy storage device 12, gear system 20, etc. Specifically in one example, the controller 26 may send signals to an actuator in the motor 14 to increase or decrease the rotational output generated by the motor and transferred to the gear system. The other adjustable components receiving commands from the controller may also function in a similar manner. Therefore, the controller 26 receives signals from the various sensors and employs various actuators to adjust system operation based on the received signals and instructions stored in memory (e.g., non-transitory memory) of the controller. As another example, the controller 26 may make a logical determination regarding a positon of an actuator in a commanded component based on logic rules that are a function of a parameter. The controller may then generate a control signal that is sent to the actuator. The control signal, for instance, may be generated using a look-up table indexed to operating conditions. However, other suitable schemes for determining the make-up of control signals sent to actuators in controllable components have been envisioned.

The controller 26 may also receive signals from sensors in the energy storage device 12, motor 14, etc., shown in FIG. 1. The sensors providing input into the controller may include a motor speed sensor 50, an energy storage device temperature sensor 52, etc. Additionally, the controller 26 is also configured to receive a pedal position from a pedal position sensor 54 coupled to a pedal 56 actuated by an operator 58.

FIG. 2 shows a first example of a gear device 200. The gear device 200 may be included in the gear system, shown in FIG. 1. However, in other examples, the gear device 200 may be included in other suitable systems transferring rotational energy between selected components.

The gear device 200 includes an outer carrier 202 and an inner carrier 204. In the illustrated example, the inner carrier 204 and the outer carrier 202 have a cylindrical shape. The inner carrier 204 includes an interior surface 206 coupled to a rotational component such a shaft, bearing, etc. Thus, the rotational component may impart rotational energy to or otherwise enable rotation of the gear device 200.

The outer carrier 202 includes an outer section 208 having a plurality of gear teeth 210 extending therefrom. The gear teeth 210, in the illustrated example, have a substantially similar pitch 212, pressure angle 214, tooth depth 216, and axial tooth width 218. However, in other examples, one or more of the aforementioned geometric characteristics of the plurality of gear teeth may vary between two or more sets of teeth. It will be understood that the gear teeth 210, when in operation mate with corresponding gear teeth in another device (e.g., gear device, gear belt, gear chain, etc.).

However, the gears are designed with a selected amount of lash to allow for gear lubrication and a reduced chance of binding. Gear lash is the spacing between adjacent gear teeth when two gears are mated. Gear lash, however, can give rise to NVH in the gearing system. The NVH may become more pronounced during transient conditions in the system. To reduce the NVH, geometric structures are provided in the body of the gear device to attenuate frequencies. The size and profile of the attenuating structures may be adjusted to achieve dampening of targeted frequency bands. The targeted frequency bands may be selected based on end-use system vibrational qualities, for instance.

The attenuating structures include struts 220 radially extending between the outer carrier 202 and the inner carrier 204. The struts 220 are substantially equally spaced around the inner carrier 204 to reduce torsional loading on the shaft or other rotational component(s) attached to the gear device. To elaborate, sequential struts are angularly separated by a substantially similar amount, the angular separation measured from a rotational axis 222. Additionally, the struts 220 have a substantially constant thickness 223, in the first example, shown in FIG. 1. However, in other examples, the thickness of one or more of the struts may vary along their length.

The attenuating structures also include resonators 224. The resonators 224 extend between sequential struts. In the illustrated example, the resonators 224 are shown arranged in an inner row 226 and an outer row 228. However, numerous suitable resonator arrangements have been envisioned such as resonators positioned in a single row or three or more rows. In the illustrated example, the resonators in the inner row 226 are not radially aligned with resonators in the outer row 228. However, in other examples, in a multi-row resonator arrangement the resonators in each row may be radially aligned.

In the illustrated example, the struts 220 and the resonators 224 form a circular grid. The openings 230 or resonators 224 are provided in the slots in the grid. The layout of both the openings and the resonators allow for highly granular vibration dampening tuning in the gear device. The grid includes four rows and twelve columns, in the illustrated example. It will be understood that a variety of suitable grid patterns have been envisioned such as a grid with a single row, two rows, three rows, more than four rows, less than twelve columns, more than twelve columns, etc.

It will also be understood that the complex shape of the gear device described herein may be achieved through additive manufacturing of at least a portion of the device. For instance, the configuration of the outer carrier 202, the inner carrier 204, the struts 220, the resonators 224, openings 230, and/or a plurality of arcuate beams 238 in the grid pattern may be achieved by additively manufacturing the inner carrier, outer carrier, struts, resonators, and/or beams. End plates 300 and 302, shown in FIG. 3, may also be additively manufactured along with the aforementioned components. The additive manufacturing enables complex shapes (e.g., the complex arrangement between the struts, resonators, beams, etc.) in the gear to be achieved. It will however be understood that other portions of the device, such as the gear teeth may be manufactured via other suitable techniques such as milling, casting, etc.

Each of the resonators 224 have lateral sides 232 adjacent to (e.g., contacting) or in some cases forming a continuous structure with portions of the struts along their length. Each of the resonators 224 also include an outer side 234 and an inner side 236 each having curvature, in the illustrated example. The radius of curvature of each of the outer side 234 and the inner side 236 may be substantially equivalent. To elaborate, each of the resonators may be in the shape of an annular sector. However, other resonator shapes have been contemplated, such as square shapes, triangular shapes, etc.

The gear device 200, shown in FIG. 1, includes the plurality of arcuate beams 238 extending between the sequential struts. The beams 238 are specifically contoured with a rounded curvature, in the illustrated embodiment. However, beams 238 with other curvature profiles have been envisioned. The beams 238 serve to reinforce the resonators 224 and struts 220, thereby increasing the device's structural integrity. It will be understood that the beams raise the upper torsional modes, thereby widening the bands attenuated by the gear device, if desired.

An axis system is provided in FIG. 2 and FIGS. 3-14 when appropriate, to establish a common frame of reference. The axis system includes the axis of rotation 222 and a radial axis 292. It will be understood that a radial axis is any axis perpendicular to the axis of rotation.

It will be understood that features from the different gear device embodiments described herein may be selectively combined in other embodiments of the gear device. Furthermore, the different embodiments of the gear device described herein may include common features that are not redundantly described for brevity.

FIG. 3 shows the gear system 200 illustrated in FIG. 2 with a first axial end plate 300 and a second axial end plate 302 axially bounding the struts 220 and the resonators 224, shown in FIG. 2. To elaborate, the first axial end plate 300 and/or the second axial end plate 302 may extend in a plane from the outer carrier to the inner carrier. However, in other examples, the end plates may have curved profiles and/or only partially extend between the inner and outer carriers. The end plates structurally reinforce the gear device and may also protect the struts, attenuators, etc., from particulate contamination that can lead to unwanted gear wear, for instance. The first and second axial end plates 300 and 302 form a continuous surface, in the illustrated example. That is to say that adjacent components are connected to one another and no components in the structure are free floating. However, other end plate contours have been envisioned. Furthermore, it will be understood that the first and second axial end plates obscure the view of underlying components in FIG. 3. Additionally, the first and second axial end plates 300 and 302 do not radially extend beyond the gear teeth 210, in the example shown in FIG. 3. However, in other examples, the radius of the first and/or second axial end plates may be increased such that they at least partially overlap the gear teeth or in some cases extend radially past the teeth.

It will be understood that the first and second axial end plates 300 and 302, the gear teeth 210, the outer carrier 202, the inner carrier 204, the struts 220, the resonators 224, and/or the beams 238, shown in FIG. 2, may form a continuous structure. In such an example, the aforementioned components may be manufactured out of a common material or common materials, such as metal (e.g., steel, titanium, aluminum, etc.), polymeric materials, ceramic materials, etc. However, in other examples, the aforementioned components may be manufactured out of different materials. For instance, the resonators may be manufactured out of a denser metal than the metal used to construct the carriers or vice versa to allow for more granular mass tuning in gear device. For example, the resonators may be manufactured out of steel while the carriers may be manufactured out of aluminum. In this way, the resonators may be manufactured out of a different material than the carriers, in one example. However, numerous suitable material constructions of the gear device, have been envisioned.

FIG. 4 shows an example of a gear device 400 with axial end plates 402 having openings 404 extending there through. The end plates may be constructed with openings to allow for addition mass distribution tuning in the gear device. Gear teeth 406 extending from an outer carrier are also depicted in FIG. 4.

FIG. 5 shows a view of the gear device 400, depicted in FIG. 4 with a portion of one of the axial end plates 402 removed to reveal the underlying components such as struts 500 and resonators 502. The struts 500, resonators 502, inner carrier 504, and outer carrier 506 may have a similar profile and functionality to the struts, resonators, and carriers illustrated in FIG. 2. Therefore, redundant description is omitted for brevity. It will also be understood that various structural and/or functional features from the different device embodiments described herein may be combined to form other device embodiments with combinations of the structural and/or functional features from the selected device embodiments.

FIG. 6 shows another perspective view of the gear device 400 depicted in FIG. 5 with portions of the axial end plates 402 removed to reveal underlying components. As shown, an inner surface 600 of the axial end plates 402 is axially offset from the struts 500 and resonators 502. However, in other examples, the struts and resonators may be adjacent to (e.g., face sharing contact with) the axial end plates. Specifically, in one example, the axial end plates may form an axially uninterrupted shape with the struts and resonators.

FIG. 6 illustrates the end plates 402 offset from the gear teeth 406 in the gear device 400. However, in other examples, the gear teeth may have an axial length that extends down a length of the end plates or in some cases axially beyond at least one of the end plates.

FIG. 7 depicts another example of a gear device 700. The gear device 700 again includes an inner carrier 702 and an outer carrier 704 having struts 706 extending radially therebetween. The gear device 700 also includes beams 707 extending between sequential struts. The gear device 700 also includes resonators 708 extending circumferentially between sequential struts. As shown, the resonators 708 are arranged in a circumferential row. Thus, in the row each of the resonators 708 have a common radial position with regard to the device's rotational axis 222.

In the example shown in FIG. 7, the struts 706 taper in an inward direction toward the rotational axis 222. However, in other examples, the struts may taper in an outward radial direction. Still further in other examples, a portion of the struts may have a tapered profile while another portion of the struts may have a substantially constant thickness along their length. Struts with a substantially constant thickness may lower the frequencies attenuated by the device due to their decreased bending stiffness. Thus, the thickness profile of the struts may be chosen to increase or decrease frequencies attenuated by the gear device.

FIG. 8 illustrates an exploded view of the gear device 700 illustrated in FIG. 7. The outer carrier 704, struts 706, inner carrier 702, and resonators 708 are again illustrated.

As shown in FIG. 8, the resonators 708 are removed from resonator trays 800 in the exploded view, shown in FIG. 8. Thus, when assembled, the resonators 708 reside in the trays 800. The trays 800 include walls 802 receiving the resonators 708. The walls 802 may have a profile corresponding with the sidewalls 804 of the resonators 708. In this way, the mating between the resonators and the trays may take place. However, other suitable resonator and tray profiles may be used such as profiles where openings, gaps, etc., exist between the trays and resonators, in other examples. End walls 805 of the resonators 708 are also shown in FIG. 8. The end walls 805 may be aligned with a radial plane.

The resonator trays 800 axially extend from the struts 706 in an axial direction 810. Thus, the resonator trays 800 and therefore the resonators 708 are asymmetrically axially aligned with regard to the struts 706. However, in other examples, the resonator trays may extend in a second axial direction opposing the axial direction 810. Therefore, in such an example, the resonator trays may be symmetrically axially aligned with regard to the struts. However, numerous suitable tray arrangements have been contemplated.

The axial width 812 of the inner carrier 702 and an axial width 814 the outer carrier 704 are greater than the axial width 816 of the struts 706. It will be appreciated that increasing the width of the carriers may allow for lower attenuation frequencies. As such, during gear device design the axial width of the inner and/or outer carrier may be selected to achieve targeted frequency attenuation.

FIG. 9 depicts another embodiment of a gear device 900 where the axial length 901 of the inner carrier 902 and the outer carrier 904 is increased. To further structurally reinforce the device, a first set of struts 906 is provided on a first axial side 908 of the resonators 910 and a second set of struts 912 is provided on a second axial side of the resonators opposing the first axial side. However, other strut arrangements in the device have been envisioned. In one example, the gear device 900 shown in FIG. 9 may be designed to attenuate frequencies in the range between 1500 Hz-4000 Hz. In this way, the gear device may attenuate a desired range of vibrations in the gear system. However, numerous suitable attenuated frequency bands have been envisioned. It will be understood, that various geometric features of the gear device 900 may be altered to achieve different attenuation characteristics. To elaborate, the width of the carriers and/or resonators may be adjusted (e.g., increased/decreased) to alter the frequencies damped by the device.

FIG. 10 shows yet another embodiment of a gear device 1000 where the axial width 1001 of both the inner and outer carriers 1002 and 1004 are again increased. In one example, the gear device 1000 shown in FIG. 10 may be designed to attenuate frequencies in the range between 1200 Hz-2700 Hz. However, as previously discussed, the device may be configured to attenuate other frequency ranges, in other embodiments.

FIG. 11 illustrates another example of a gear device 1100. The gear device 1100 again includes struts 1102 extending between an inner carrier 1104 and an outer carrier 1106. Again, resonators 1108 extend between the struts 1102. Beams 1110 are also shown extending between the struts. The struts 1102 are shown tapering in an inward radial direction 1112. To elaborate the struts increase in thickness in an outward radial direction. It will be understood that increasing the struts thickness increases the magnitude of the frequencies attenuated by the gear device. In one example, the gear device 1100, shown in FIG. 11, may be designed to attenuate frequencies in the range between 1500 Hz-4000 Hz. However, as previously discussed, the device may be configured to attenuate other frequency ranges, in other embodiments.

FIG. 12 shows another example a gear device 1200. The gear device 1200 again includes struts 1202 extending between an inner carrier 1204 and an outer carrier 1206. The struts 1202 have a substantially constant thickness 1207. However, other strut profiles may be used. In one example, the gear device 1200, shown in FIG. 12, may be designed to attenuate frequencies in the range between 1000 Hz-3300 Hz. However, as previously discussed, the device may be configured to attenuate other frequency ranges, in other embodiments.

FIG. 13 depicts yet another example of a gear device 1300. The gear device 1300 again includes struts 1302 extending between an inner carrier 1304 and an outer carrier 1306. The gear device 1300 illustrated in FIG. 13 does not include arcuate beams which narrows the attenuation bands and decreases stiffness of torsional resonator modes. Therefore, in one example, the gear device 1300, shown in FIG.

13, may be designed to attenuate frequencies in the range between 1000 Hz-3100 Hz. However, as previously discussed, other frequency ranges attenuated by the device have been envisioned.

FIG. 14 illustrates another example of a gear device 1400. The gear device 1400 includes five rows of resonators 1402 in FIG. 14 and the gear device 1400 may be designed to attenuate frequency bands between 400 Hz-940 Hz. It will be understood, that each of the resonators in a common row have a similar radial positioned with regard to the rotational axis 222. However, as previously discussed, other frequency ranges for device attenuation have been envisioned.

FIGS. 1-14 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

FIG. 15 shows a method 1500 for operating a gear device. It will be appreciated that method 1500 may be implemented via the gear devices and systems in which they are deployed depicted in FIGS. 1-14. However, in other examples, the method 1500 may be implemented via other suitable gear devices and systems. Instructions for carrying out method 1500 may be at least partially executed by a controller based on instructions stored in memory (e.g., non-transitory memory) of the controller and in conjunction with signals received from sensors, such as the sensors described above with regard to FIG. 1. It will also be understood that the method step may include the controller sending command signals to actuators in the commanded component, the command triggering actuators in the commanded component to adjust the component, as desired. However, it will also be appreciated that at least a portion of the method step may be passively implemented.

At 1502 the method includes rotating a gear device to attenuate vibrations in a targeted frequency range. In this way, the gear device can reduce expected vibrations in system in which the device is deployed, thereby decreasing system NVH.

The technical effect of providing a gear device with radially aligned struts and resonators extending there between is to attenuate targeted frequency bands in the system in which the device is deployed. As a result, NVH in the system in which the gear device is utilized is reduced, thereby increasing customer satisfaction as well as reducing system wear.

The invention is further described in the following paragraphs. In one aspect, a gear device is provided that comprises an outer carrier; a plurality of radially aligned struts extending from the outer carrier; a plurality of openings positioned between the plurality of radially aligned struts, where the plurality of radially aligned struts and openings are designed to attenuate targeted vibrations occurring during rotation of the gear device; and an inner carrier coupled to the outer carrier via the plurality of radially aligned struts extending there between.

In another aspect, a method for operating a gear device is provided which comprises rotating the gear device to attenuate vibrations in a targeted frequency range; where the gear device includes: an outer carrier; a plurality of radially aligned struts extending from the outer carrier; a plurality of openings positioned between the plurality of radially aligned struts; and an inner carrier coupled to the outer carrier via the plurality of radially aligned struts extending there between.

In yet another aspect, a gear device in a vehicle drivetrain is provided that comprises an outer carrier; a plurality of radially aligned struts extending from the outer carrier; a plurality of openings positioned between the plurality of radially aligned struts and a plurality of resonators, where the plurality of radially aligned struts, openings, and resonators attenuating targeted vibrations occurring during rotation of the gear device; and an inner carrier coupled to the outer carrier via the plurality of radially aligned struts extending there between.

In any of the aspects or combinations of the aspects, the gear device may further comprise a plurality of resonators sequentially spaced angularly around the gear device and coupled to the plurality of radially aligned struts.

In any of the aspects or combinations of the aspects, the plurality of resonators may include a first row positioned radially inward towards a rotational axis of the gear device from a second row in the plurality of resonators.

In any of the aspects or combinations of the aspects, the gear device may further comprise a first axial end plate and a second axial end plate coupled to the inner carrier and the outer carrier.

In any of the aspects or combinations of the aspects, the first axial end plate, the second axial end plate, the inner carrier, the outer carrier, and the plurality of radially aligned struts may form a continuous structure.

In any of the aspects or combinations of the aspects, the plurality of radially aligned struts may be axially offset from the first axial end plate and the second axial end plate.

In any of the aspects or combinations of the aspects, the plurality of radially aligned struts may taper in an inward radial direction extending toward a rotational axis of the gear device.

In any of the aspects or combinations of the aspects, the gear device may further comprise a plurality of arcuate beams, where each of the plurality of arcuate beams may extend between two sequential struts in the plurality of radially aligned struts.

In any of the aspects or combinations of the aspects, where the targeted vibrations may be in a range of frequencies between 1000 Hz and 4000 Hz.

In any of the aspects or combinations of the aspects, the gear device may be included in a battery electric vehicle (BEV).

In any of the aspects or combinations of the aspects, the targeted frequency range may be a frequency band between 1000 Hz and 4000 Hz.

In any of the aspects or combinations of the aspects, the plurality of radially aligned struts may taper in an inward radial direction extending toward a rotational axis of the gear device.

In any of the aspects or combinations of the aspects, the plurality of resonators may include a first row positioned radially inward towards a rotational axis of the gear device from a second row in the plurality of resonators.

In any of the aspects or combinations of the aspects, the gear device may further comprise a plurality of arcuate beams and where each of the plurality of arcuate beams extends between two sequential struts in the plurality of radially aligned struts.

In any of the aspects or combinations of the aspects, the gear device may further comprise a first axial end plate and a second axial end plate coupled to the inner carrier and the outer carrier.

In any of the aspects or combinations of the aspects, the plurality of radially aligned struts and the plurality of resonators may be axially offset from the first axial end plate and the second axial end plate.

In any of the aspects or combinations of the aspects, the plurality of resonators may be constructed out of a different material than the inner carrier and the outer carrier.

In any of the aspects or combinations of the aspects, the plurality of struts may taper in an outward radial direction extending away from a rotational axis of the gear device.

In any of the aspects or combinations of the aspects, the plurality of resonators may include a first row positioned radially inward towards a rotational axis of the gear device from a second row in the plurality of resonators.

In any of the aspects or combinations of the aspects, the gear device may further comprise a plurality of arcuate beams and where each of the plurality of arcuate beams extends between two sequential struts in the plurality of radially aligned struts.

In another representation, a first gear comprising a plurality of teeth mated with corresponding teeth in a second gear, a plurality of attenuating structures designed to attenuate targeted vibrations during rotation of the first and second gears, the plurality of attenuating structures including a plurality of radially aligned struts extending between an inner carrier and an outer carrier and a plurality of resonators extending between sequential struts.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "substantially" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A gear device comprising:
   an outer carrier;
   a plurality of radially aligned struts extending from the outer carrier;
   a plurality of openings positioned between the plurality of radially aligned struts, where the plurality of radially aligned struts and openings are designed to attenuate targeted vibrations occurring during rotation of the gear device;
   an inner carrier coupled to the outer carrier via the plurality of radially aligned struts extending there between; and
   a plurality of arcuate beams, where each of the plurality of arcuate beams extends between two sequential struts in the plurality of radially aligned struts.

2. The gear device of claim 1, further comprising a plurality of resonators sequentially spaced angularly around the gear device and coupled to the plurality of radially aligned struts.

3. The gear device of claim 2, where the plurality of resonators include a first row positioned radially inward towards a rotational axis of the gear device from a second row in the plurality of resonators.

4. The gear device of claim 1, further comprising a first axial end plate and a second axial end plate coupled to the inner carrier and the outer carrier.

5. The gear device of claim 4, where the first axial end plate, the second axial end plate, the inner carrier, the outer carrier, and the plurality of radially aligned struts form a continuous structure.

6. The gear device of claim 4, where the plurality of radially aligned struts are axially offset from the first axial end plate and the second axial end plate.

7. The gear device of claim 1, where the plurality of radially aligned struts taper in an inward radial direction extending toward a rotational axis of the gear device.

8. The gear device of claim 1, where the targeted vibrations are in a range of frequencies between 1000 Hz and 4000 Hz.

9. The gear device of claim 1, where the gear device is included in a battery electric vehicle (BEV).

10. A method for operating a gear device, comprising:
rotating the gear device to attenuate vibrations in a targeted frequency range;
where the gear device includes:
an outer carrier;
a plurality of radially aligned struts extending from the outer carrier;
a plurality of openings positioned between the plurality of radially aligned struts;
an inner carrier coupled to the outer carrier via the plurality of radially aligned struts extending there between; and
a plurality of resonators that include a first row positioned radially inward towards a rotational axis of the gear device from a second row in the plurality of resonators.

11. The method of claim 10, where the targeted frequency range is a frequency band between 1000 Hz and 4000 Hz.

12. The method of claim 10, where the plurality of radially aligned struts taper in an inward radial direction extending toward the rotational axis of the gear device.

13. The method of claim 10, where the gear device further comprises a plurality of arcuate beams and where each of the plurality of arcuate beams extends between two sequential struts in the plurality of radially aligned struts.

14. The method of claim 10, where the gear device further comprises a first axial end plate and a second axial end plate coupled to the inner carrier and the outer carrier.

15. A gear device in a vehicle drivetrain, comprising:
an outer carrier;
a plurality of radially aligned struts extending from the outer carrier;
a plurality of openings positioned between the plurality of radially aligned struts and a plurality of resonators, where the plurality of radially aligned struts, openings, and resonators attenuating targeted vibrations occurring during rotation of the gear device; and
an inner carrier coupled to the outer carrier via the plurality of radially aligned struts extending there between.

16. The gear device of claim 15, further comprising a first axial end plate and a second axial end plate coupled to the inner carrier and the outer carrier, where the first axial end plate, the second axial end plate, the inner carrier, the outer carrier, and the plurality of radially aligned struts form a continuous structure.

17. The gear device of claim 16, where the plurality of radially aligned struts and the plurality of resonators are axially offset from the first axial end plate and the second axial end plate.

18. The gear device of claim 15, where the plurality of resonators are constructed out of a different material than the inner carrier and the outer carrier.

* * * * *